(12) United States Patent
Soong

(10) Patent No.: US 9,276,415 B2
(45) Date of Patent: Mar. 1, 2016

(54) CHARGING STATION HAVING BATTERY CELL BALANCING SYSTEM

(71) Applicant: Go-Tech Energy Co., Ltd., New Taipei (TW)

(72) Inventor: Tzu-Wen Soong, Taipei (TW)

(73) Assignee: Go-Tech Energy Co. Ltd., New Taipei (TW)

( * ) Notice: Subject to any disclaimer, the term of this patent is extended or adjusted under 35 U.S.C. 154(b) by 218 days.

(21) Appl. No.: 14/029,949

(22) Filed: Sep. 18, 2013

(65) Prior Publication Data

US 2015/0077039 A1    Mar. 19, 2015

(51) Int. Cl.
*H02J 7/00* (2006.01)
*B60L 11/18* (2006.01)

(52) U.S. Cl.
CPC ........... *H02J 7/0014* (2013.01); *B60L 11/1818* (2013.01); *B60L 11/1824* (2013.01); *B60L 11/1861* (2013.01); *B60L 11/1866* (2013.01); *H02J 7/0016* (2013.01); *H02J 7/0018* (2013.01); *B60L 2230/12* (2013.01); *B60L 2240/545* (2013.01); *B60L 2240/547* (2013.01); *B60L 2240/549* (2013.01)

(58) Field of Classification Search
CPC .................................................... H02J 7/0014
USPC ........................................................ 320/107
See application file for complete search history.

(56) References Cited

U.S. PATENT DOCUMENTS

| | | | |
|---|---|---|---|
| 2009/0139781 A1* | 6/2009 | Straubel | 180/65.1 |
| 2010/0253287 A1 | 10/2010 | Kim et al. | |
| 2011/0068744 A1 | 3/2011 | Zhu | |
| 2011/0074355 A1 | 3/2011 | Dao et al. | |

FOREIGN PATENT DOCUMENTS

| | | |
|---|---|---|
| DE | 102010017439 | 12/2011 |
| TW | 201029289 | 8/2010 |
| WO | WO 2010/093186 | 8/2010 |

OTHER PUBLICATIONS

Office action issued by Taiwanese patent office received on Jul. 15, 2015, for the US counterpart case.

* cited by examiner

*Primary Examiner* — Thuan Do
(74) *Attorney, Agent, or Firm* — Che-Yang Chen; Law Office of Michael Chen

(57) ABSTRACT

A charging station which has a battery cell balancing system is disclosed. The charging station includes: a number of balancing charging units, each has: a detecting element for detecting a state of charge of a battery cell; and a charging element for processing charging to the battery cell; a power unit for providing electric power; and a charging control unit, linked to the balancing charging units, and the power unit, for controlling the electric power from the power unit to the charging element to charge the battery cell. The battery cell is linked in serial or parallel with other battery cells in a battery pack. The charging control unit stops the power unit to charge the battery cell when the state of charge of the battery cell detected by the detecting element is full or exceeds a predetermined value.

6 Claims, 4 Drawing Sheets

CHARGING STATION HAVING BATTERY CELL BALANCING SYSTEM

FIELD OF THE INVENTION

The present invention relates to a charging station. More particularly, the present invention relates to a charging station which has battery cell balancing systems. Thus, each battery pack charged by the charging station doesn't need to comprise a battery cell balancing system to extend life of the battery. Size and cost of the battery can be reduced, too.

BACKGROUND OF THE INVENTION

With the battery becoming increasingly popular as a power source, there has been an equally strong demand, maximizing battery life. Battery imbalance (that means mismatch of the state of charge of battery cells in a battery pack) in large lithium-ion battery pack is a problem. This problem is caused by differences in manufacturing processes, working conditions and battery aging. The imbalance may reduce the total capacity of the battery pack, and may damage the battery pack, too. The imbalance of the battery from charging to discharging state can not be traced. If it is not closely monitored, the battery may leads to overcharge or over-discharge, which will permanently damage the battery. For car-used battery, the above issue becomes more significant, especially for lithium batteries.

In general, the voltage of each lithium battery is not high and the current is not strong enough. Therefore, lithium iron phosphate batteries are developed to enhance voltage and current. However, when such batteries are connected in series and parallel, it is also easily cause "imbalance" to shorten caused discharge time of the battery pack (i.e., the lifetime time is shortened), and accelerate the aging of the battery pack.

BMS (Battery Management System) is a protection mechanism. It is used for monitoring the whole battery pack. When the battery pack is detected to have some battery cells which are imbalance, it will turn off the entire battery pack system and the battery pack no longer supply power. The BMS uses a balance loop to achieve the above goal. Most of the balance loops are used during battery pack charging. It is scarcely used in battery pack discharge. The balance loop can be divided into two type, the active type and passive type. The active type balance loop has advantage of high efficiency, but it also has drawback of high cost and big size. Passive type balance loop has advantages of cheap cost. However, the disadvantage is low efficiency which will generate heat. Balance effect is limited. Although the active type is highly efficient, considering the price, most of the battery packs are chosen to built-in passive type balance loop.

For an electron vehicle, it is not desired that the battery pack which is used is too large. Therefore, the BMS of the battery should be designed properly. A prior art can be a good example. Please refer to FIG. 1. US Patent Application No. 20120105001 discloses a battery management system. The battery management system includes several subsystem blocks, an energy storage master unit 100, and battery pack systems 104. The energy storage master may interface with the vehicle master controller (ZR32-A) 101 with a pass through from the energy storage master 100 by way of CAN or other communication method to an external charger 102. The vehicle master controller 101 may interface with the external charger 102 either directly or through a charging station interface. The energy storage system may include several strings of batteries 103 in an electric vehicle. Within each of these strings 103, there may be packs 104, and each pack is comprised of several battery modules. The battery packs 104 may communicate to the energy storage master 100 by way of a second CAN bus. Two battery packs 104 may make up a string 103. The packs may be controlled by a pack master, which may communicate with the energy storage master 100 using a single CAN bus for the entire system. Each pack master may communicate with its local module unit using an serial peripheral interface (SPI) bus. The local module unit and pack master communications may be isolated. The battery packs containing 10 prismatic battery cells each. There are 2 packs per string, and a variable number of strings per vehicle (typically 3 to 4).

According to the invention, the battery pack comes with the battery cell balancing system would still be bulky. However, it provides people a way to reduce the size: taking the battery cell balancing system out of the battery pack. If one or more sets of battery cell balancing systems can be setup out of battery packs, the cost of battery cell balancing system can be saved. In addition, the battery pack size can be smaller. More economic and convenient, a charging station can combine the battery cell balancing system to provide power to battery pack while monitors state of each battery cell or pack. It is the point the inventor created the present invention.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a charging station having a battery cell balancing system includes: a plurality of balancing charging units, each has: a detecting element for detecting a state of charge of a battery cell; and a charging element for processing charging to the battery cell; a power unit for providing electric power; and a charging control unit, linked to the balancing charging units, and the power unit, for controlling the electric power from the power unit to the charging element to charge the battery cell. The battery cell is linked in serial or parallel with other battery cells in a battery pack, and the charging control unit stops the power unit to charge the battery cell when the state of charge of the battery cell detected by the detecting element is full or exceeds a predetermined value.

Preferably, the state of charge can be determined by temperature, voltage or current of the battery pack.

Preferably, the state of charge is in the form of percentage indicating the amount of energy left in a battery cell.

Preferably, the balancing charging unit is an active type or a passive type.

Preferably, the balancing charging unit can transfer electric power from a higher charged battery cell to a lower charged battery cell when the balancing charging unit is the active type.

Preferably, the charging station further comprises a resistor to absorb or consume electric power from a higher charged battery cell when the balancing charging unit is the passive type.

Preferably, the charging station further comprises a memory unit, linked to the charging control unit, for providing historical data of the battery cell so that the charging control unit can know when the battery cell is fully charged or exceeds a predetermined value.

Preferably, the historical data is temperature, voltage or current of the battery cell when the battery cell was measured at any time.

DETAILED DESCRIPTION OF THE PREFERRED EMBODIMENTS

The present invention will now be described more specifically with reference to the following embodiments.

First Embodiment

Figure 1:
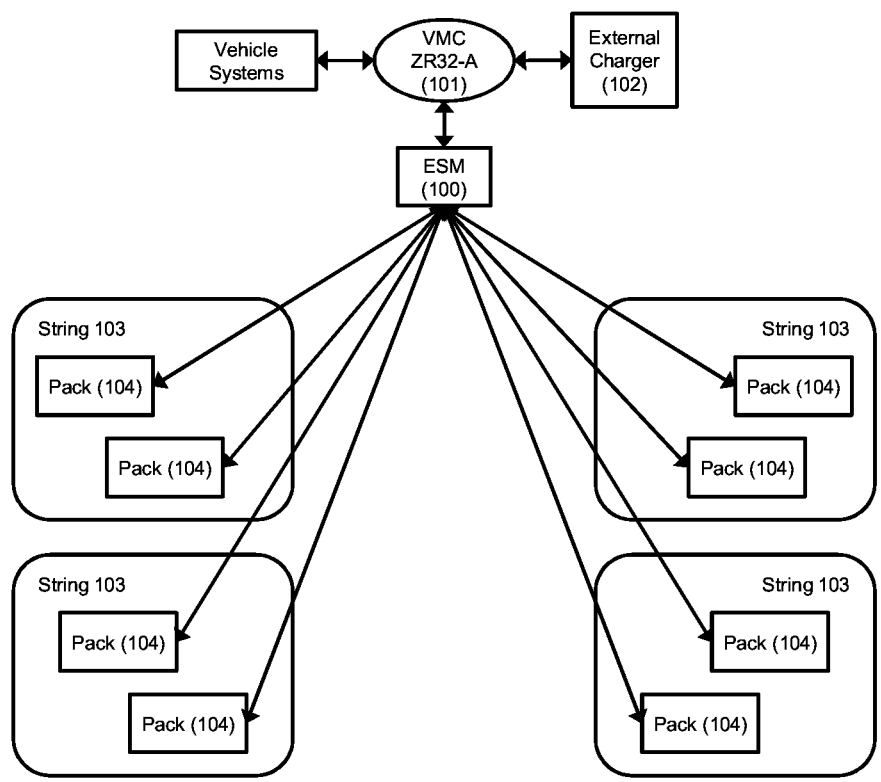
FIG. 1 shows a prior art of battery cell balancing system.
Figure 2:
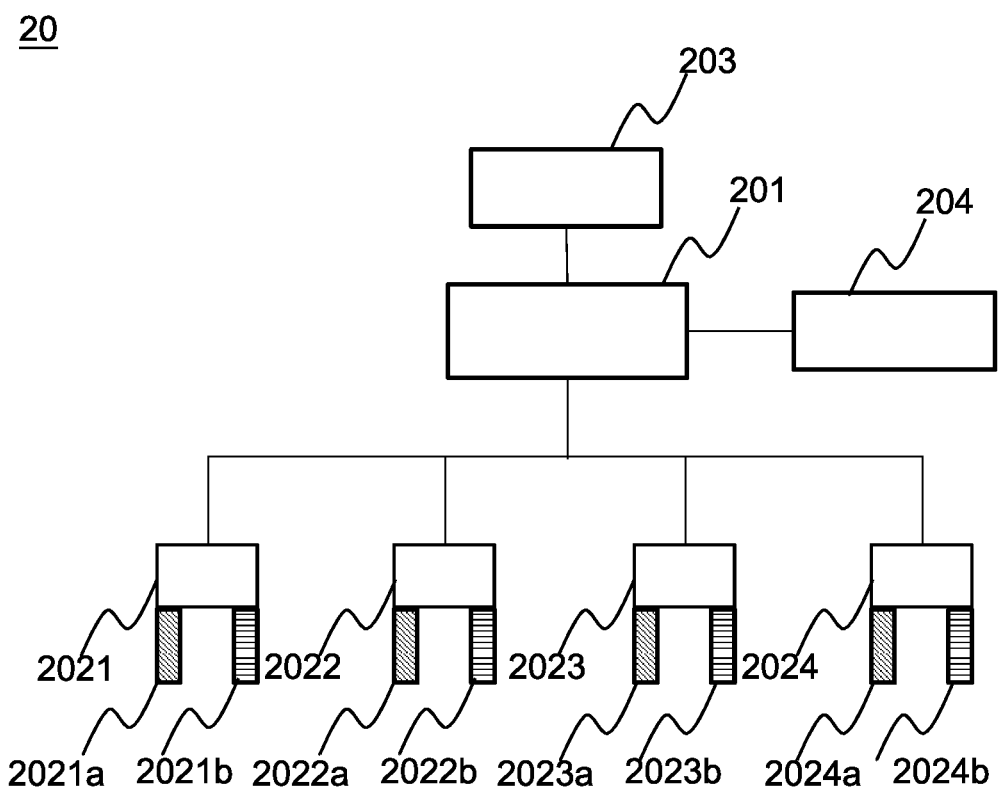
FIG. 2 illustrates a schematic diagram of a first embodiment of the present invention.
Figure 3:
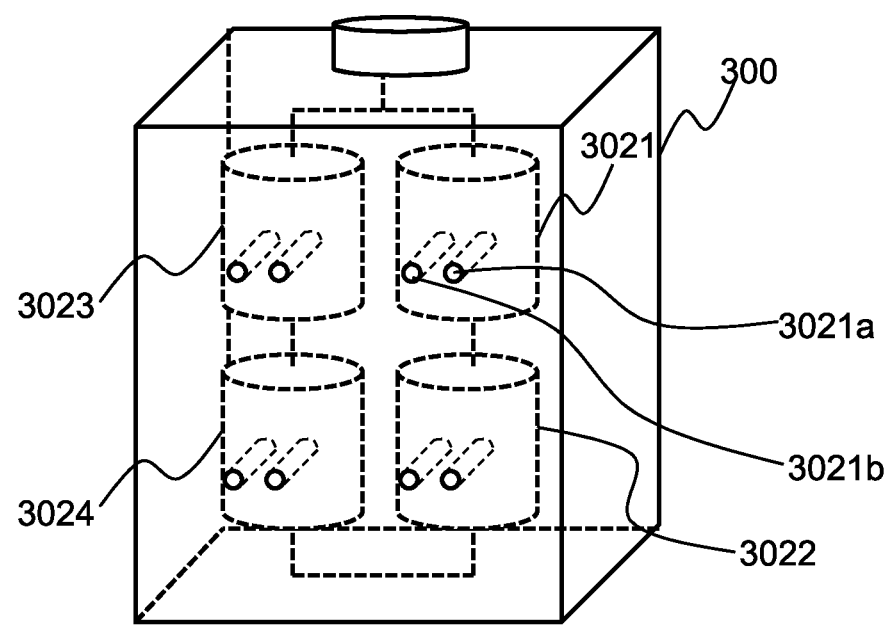
FIG. 3 illustrates a battery used according to the present invention.

Please refer to FIG. 2 and FIG. 3. FIG. 2 illustrates a schematic diagram of a first embodiment of the present invention. FIG. 3 illustrates a battery used according to the present invention. A charging station 20 has a battery cell balancing system. It comprises a number of balancing charging units 2021, 2022, 2023 and 2024, a charging control unit 201 and a power unit 203. Each balancing charging units 2021, 2022, 2023 and 2024 has a detecting element 2021a, 2022a, 2023a and 2024a, respectively. Each balancing charging units 2021, 2022, 2023 and 2024 also has a charging element 2021b, 2022b, 2023b and 2024b, respectively.

The detecting elements 2021a, 2022a, 2023a and 2024a can detecting a state of charge of a battery cell 3021, 3022, 3023 and 3024. The charging elements 2021b, 2022b, 2023b and 2024b are used for processing charging to the battery cell 3021, 3022, 3023 and 3024, respectively. The power unit 203 can provide electric power. In practice and also in this embodiment, the power unit 203 is a DC generator and provides DC power. The charging control unit 201 are linked to the balancing charging units 2021, 2022, 2023 and 2024, and the power unit 203. It can control the electric power from the power unit 203 to the charging elements 2021b, 2022b, 2023b and 2024b to charge the battery cells 3021, 3022, 3023 and 3024.

From FIG. 2, it is obvious that the charging station 20 has four balancing charging units for charging control of the battery cells 3021, 3022, 3023 and 3024. It is emphasized that the number of balancing charging units is not limited to four. In practice, the number should be more than the battery cells in a battery pack According to the present invention, the battery cell is linked in serial or parallel with other batteries in a battery pack 30 (Please refer to FIG. 3). In this embodiment, two battery cells 3021 and 3022 (or 3023 and 3024) are linked in serial; two serially linked battery strings are linked in parallel. The battery pack 30 has four battery cells 3021, 3022, 3023 and 3024 and each of the battery cells 3021, 3022, 3023 and 3024 are controlled by the balancing charging units 2021, 2022, 2023 and 2024.

The charging control unit 201 stops the power unit 203 to charge the battery cells 3021, 3022, 3023 and 3024 when the state of charge of the battery cell 3021, 3022, 3023 or 3024 detected by the detecting element 2021a, 2022a, 2023a or 2024a is full or exceeds a predetermined value. Here, state of charge is the amount of energy left in a battery cell and is the equivalent of a fuel gauge for the battery pack 30 in a battery electric vehicle. The units of state of charge are percentage points (0%=empty; 100%=full). The state of charge can be determined by temperature, voltage or current of the battery pack 30. Namely, by means of above, people can know how full the battery cell 302 can be.

There are two types of balancing charging units, active type or passive type. The first embodiment illustrates how an active type balancing charging unit is applied in the present invention. The active type balancing charging unit is designed to discharge a battery cell when the voltage difference has reached a certain extent after a period of charge. It is not necessary for each battery cell 3021, 3022, 3023 or 3024 to be 100% full. A defined state of charge of the battery cells 3021, 3022, 3023 and 3024 can be used to assume the battery cell 3021, 3022, 3023 or 3024 is fully charged or exceeds a predetermined value. The balancing charging unit 2021, 2022, 2023 or 2024 can transfer electric power from a higher charged battery cell to a lower charged battery cell. For example, when the state of charge of the battery cell 3022 is 99% full, excess power charged will be transferred to the 90% full battery cell 3024. Meanwhile, the other two battery cells 3021 and 3023 are still normally charged as long as they are not 100% fully charged. Of course, the charging control unit 201 can stop charging the battery cell 3022 while keeps charging other battery cells 3021, 3023 and 3024.

Conventionally, the balancing charging units are built in a battery pack so that the battery pack can control charge of each cell to prevent the battery pack from aging due to imbalance of battery cells. However, it will make the battery cell bulgy and more expensive. The present invention provides the design to take all balancing charging units out of the battery pack and design them into a charging station. Of course, the present invention also requests the battery pack 30 to have some specified designs: contacts (for example 3021a and 3021b) of the battery cell (for example 3021) on a housing 300 of the battery pack 30 should meet the specification of the detecting element 2021a and the charging element 2021b, respectively.

Ideally, the charging station 20 can further comprises a memory unit 204. It is linked to the charging control unit 201. The memory unit 204 can provide historical data of the battery cells 3021, 3022, 3023 and 3024 so that the charging control unit 201 can know when the battery cell 3021, 3022, 3023 or 3024 is fully charged or exceeds a predetermined value. The historical data is temperature, voltage or current of the battery cells 3021, 3022, 3023 and 3024 when the battery cells 3021, 3022, 3023 and 3024 were measured at any time.

Second Embodiment

Figure 4:
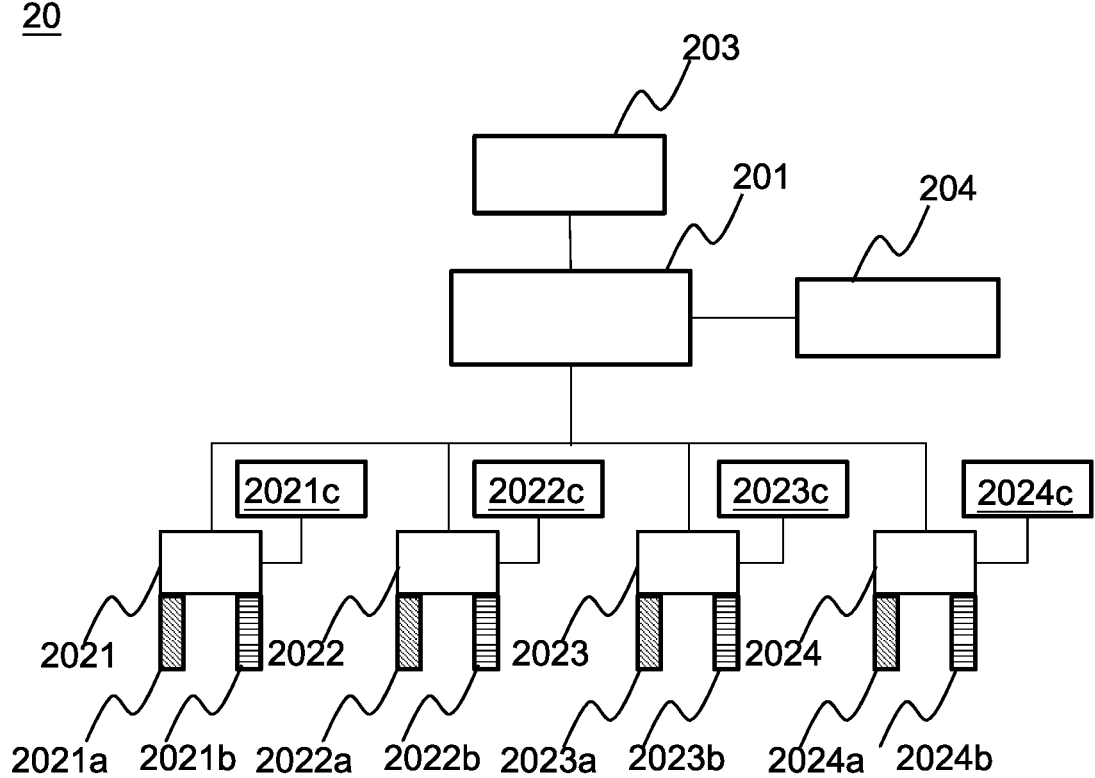
FIG. 4 illustrates a schematic diagram of a second embodiment of the present invention.

Please refer to FIG. 4. A second embodiment is illustrated. In order not to spend time on defining the same elements in the first embodiment, for then element having the same serial number in both embodiments has the same function. From FIG. 5, it is obvious that four resistor 2021c, 2022c, 2023c and 2024c are built and linked to the balancing charging units 2021, 2022, 2023 and 2024, respectively.

As mentioned above, the first embodiment illustrates how an active type balancing charging unit is applied in the present invention. The second embodiment illustrates how a passive type balancing charging unit is applied in the present invention. The passive type balancing charging unit usually absorbs or consumes electric power from a higher charged battery cell by the resistor 2021c, 2022c, 2023c or 2024c. Depending on different design, the resistors 2021c, 2022c, 2023c and 2024c can be designed to only one. It can also be other forms as long as excess electric power can be taken away and not affects the efficiency of each battery cell 3021, 3022, 3023 or 3024.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A charging station having a battery cell balancing system, comprising:
   a plurality of balancing charging units, each has:
      a detecting element for detecting a state of charge of a battery cell; and
      a charging element for processing charging to the battery cell;
   a power unit for providing electric power;
   a charging control unit, linked to the balancing charging units, and the power unit, for
      controlling the electric power from the power unit to the charging element to charge the battery cell; and
   a resistor to absorb or consume electric power from a higher charged battery cell when the balancing charging unit is a passive type;
   wherein the balancing charging unit is an active type or a passive type; and
   wherein the battery cell is linked in serial or parallel with other battery cells in a battery pack, and the charging control unit stops the power unit to charge the battery cell when the state of charge of the battery cell detected by the detecting element exceeds a predetermined value.

2. The charging station to claim 1, wherein the state of charge can be determined by temperature, voltage or current of the battery pack.

3. The charging station to claim 1, wherein the state of charge is in the form of percentage indicating the amount of energy left in a battery cell.

4. The charging station to claim 1, wherein the balancing charging unit can transfer electric power from a higher charged battery cell to a lower charged battery cell when the balancing charging unit is the active type.

5. The charging station to claim 1, further comprising a memory unit, linked to the charging control unit, for providing historical data of the battery cell so that the charging control unit can know when the battery cell is fully charged or exceeds a predetermined value.

6. The charging station to claim 5, wherein the historical data is temperature, voltage or current of the battery cell when the battery cell was measured at any time.

\* \* \* \* \*